(12) United States Patent
Herrera et al.

(10) Patent No.: US 11,379,681 B2
(45) Date of Patent: Jul. 5, 2022

(54) PROVIDING AND READING A MARKING ON AN ITEM

(71) Applicant: SICPA HOLDING SA, Prilly (CH)

(72) Inventors: Rafael Herrera, Kuala Lumpur (MY); Daniel Zahnd, Paudex (CH); Pablo Sempere, Thoiry (FR)

(73) Assignee: SICPA HOLDING SA, Prilly (CH)

(*) Notice: Subject to any disclaimer, the term of this patent is extended or adjusted under 35 U.S.C. 154(b) by 0 days.

(21) Appl. No.: 16/326,647

(22) PCT Filed: Aug. 18, 2017

(86) PCT No.: PCT/EP2017/070937
§ 371 (c)(1),
(2) Date: Feb. 19, 2019

(87) PCT Pub. No.: WO2018/033627
PCT Pub. Date: Feb. 22, 2018

(65) Prior Publication Data
US 2020/0175239 A1 Jun. 4, 2020

(30) Foreign Application Priority Data
Aug. 19, 2016 (EP) .................... 16184920

(51) Int. Cl.
*G06K 7/14* (2006.01)
*G06K 19/06* (2006.01)
(Continued)

(52) U.S. Cl.
CPC ..... *G06K 7/1434* (2013.01); *G06K 19/06103* (2013.01); *G06K 19/10* (2013.01); *G06K 2007/10504* (2013.01)

(58) Field of Classification Search
CPC .................................................... G06K 7/1434
(Continued)

(56) References Cited

U.S. PATENT DOCUMENTS 3,711,683 A 1/1973 Hamisch
6,119,943 A 9/2000 Christy
(Continued)

FOREIGN PATENT DOCUMENTS

AT 13049 5/2013
CN 101088100 12/2007
(Continued)

OTHER PUBLICATIONS

International Search Report and Written Opinion issued with respect to application No. PCT/EP2017/070937.
(Continued)

*Primary Examiner* — Rafferty D Kelly
(74) *Attorney, Agent, or Firm* — Muncy, Geissler, Olds & Lowe, P.C.

(57) ABSTRACT

Provided is a method for marking an item comprising the steps of providing a first predetermined marking on the item; providing a second predetermined marking on the item at least partially overlapping with the first marking; and determining information dependent on a relationship between the first marking provided on the item and the second marking provided on the item. Further is provided an apparatus for providing a marking on an item, an apparatus for reading a marking on an item, a computer program, and a computer program product.

12 Claims, 9 Drawing Sheets

(51) Int. Cl.
*G06K 19/10* (2006.01)
*G06K 7/10* (2006.01)

(58) Field of Classification Search
USPC .................................................. 235/462.01
See application file for complete search history.

(56) References Cited

U.S. PATENT DOCUMENTS

| | | | |
|---|---|---|---|
| 7,702,162 B2* | 4/2010 | Cheong | G06K 19/06037 |
| | | | 235/494 |
| 7,926,730 B2* | 4/2011 | Auslander | G06K 19/06046 |
| | | | 235/494 |
| 2003/0042317 A1 | 3/2003 | Behm et al. | |
| 2003/0121980 A1 | 7/2003 | Lemelson et al. | |
| 2006/0022059 A1 | 2/2006 | Juds | |
| 2008/0252066 A1 | 10/2008 | Rapoport et al. | |
| 2012/0256000 A1 | 10/2012 | Cok | |
| 2013/0092738 A1* | 4/2013 | Blasinski | G06K 7/10821 |
| | | | 235/462.04 |

FOREIGN PATENT DOCUMENTS

| | | |
|---|---|---|
| CN | 101681440 | 3/2010 |
| CN | 104820854 | 8/2015 |
| DE | 1772703 | 8/1958 |
| DE | 102013011238 | 1/2015 |
| WO | 2006049430 | 5/2006 |

OTHER PUBLICATIONS

International Preliminary Report on Patentability issued with respect to application No. PCT/EP2017/070937.

Internet article "Kak proiskhodit proverka podlinnosti denezhnykh kupiur" on fishki.net, translated in English as "*How banknotes are authenticated*" dated Jul. 12, 2013, 22 pages.

Eurasian Office Action in counterpart Eurasian Application No. 201892789/31 dated May 21, 2020 (along with the English language translation of the Office Action).

Office Action issued in counterpart Chinese Application No. 201780050848.7 dated Oct. 11, 2021 (and English language translation of the Office Action).

\* cited by examiner

Fig. 8A
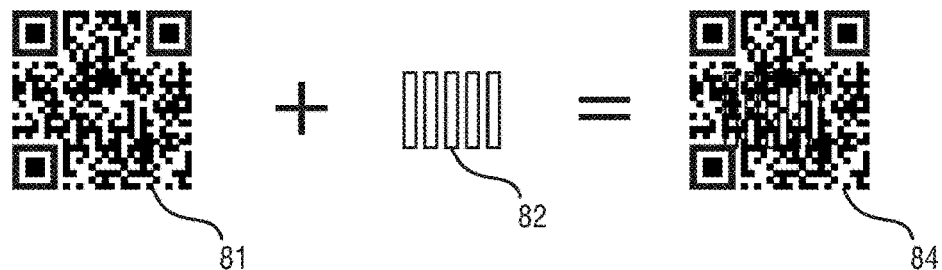
Fig. 8B
Fig. 8C
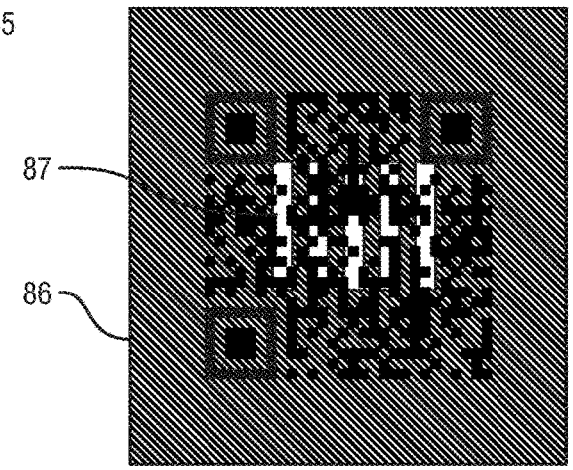
Fig. 8D
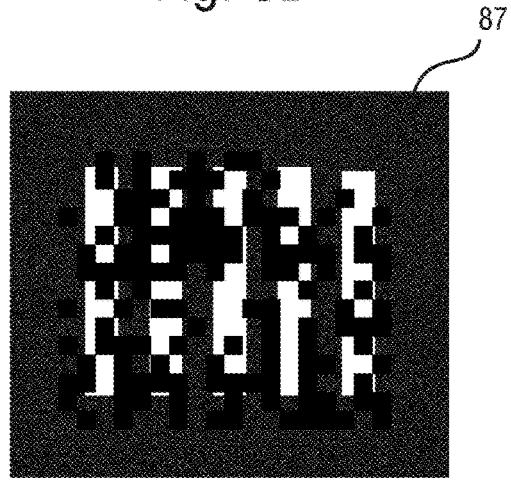
Fig. 8E
| CODE | SIGNATURE | | | | |
|---|---|---|---|---|---|
| QR1 | I1 | I2 | I3 | I4 | I5 |
| QR2 | I1 | I2 | I3 | I4 | I5 |

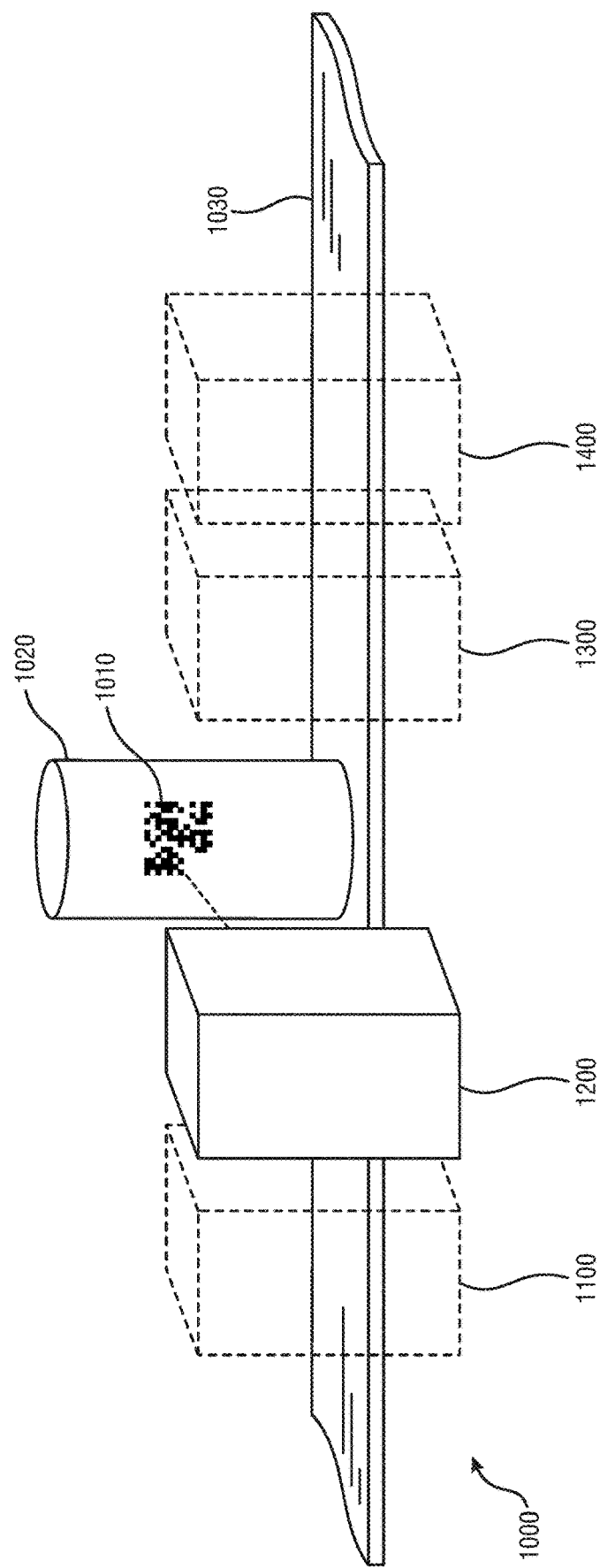

PROVIDING AND READING A MARKING ON AN ITEM

TECHNICAL FIELD

The present invention relates to providing and reading a marking on an item, e.g. for authentication of the item. Specifically, the present invention relates to a method for marking an item, an apparatus for providing a marking on an item, and an apparatus for reading a marking on an item, a computer program, and a computer program product.

BACKGROUND

More and more machine and human readable markings, also called codes or barcodes, are printed on product packages or directly on a product items for the purpose to track and trace the product items, to quickly access a brands website, for instance for consumer advertising, or to combat counterfeiting.

For instance, barcodes are found on a large number of items, including consumer products, spare parts, devices, fashion and/or luxury goods, perfumes, alcoholic and non-alcoholic beverages, tobacco products, e.g. cigarettes, cigars, loose tobacco and the like, etc. Furthermore, barcodes can also be found on all sorts of documents as items, including tickets, papers, currency bills, certificates, passports, ID cards, etc.

Typically, these barcodes are used on the item for allowing a verification of the authenticity of the corresponding item.

Specifically, by reading and decoding the barcode one can obtain information on whether or to what degree of certainty the corresponding item is authentic, genuine, or complies with legal regulations, such as proper payment of tax and/or applicable fees.

There are different types of markings and typically each type of marking is read, e.g. scanned, by a specific device. For instance there are markings or machine readable markings, also called codes or patterns, specifically there are luminescent markings. The markings may be barcodes or more specifically two-dimensional barcodes. The two-dimensional barcodes may include a data matrix or a data matrix symbol and a Quick Response, QR, code (registered trademark) and so on. There are various specific devices for reading markings. For example, luminescent codes, used for security or authentication, may be scanned by a dedicated device including a light source to excite the code, data matrix symbols, e.g. for supply chain activities, may be scanned by a conventional optical scanner, and QR codes may be decoded by a terminal such as a smartphone into further information about the item, for instance an address such as a Uniform Resource Locator, URL, of a website or the like.

These markings are provided on the item together or in combination. The downside of this proliferation of machine and human readable codes on the same product package or item is the degradation of the visual appearance, e.g. related to the visual brand identity. One way to overcome this problem is the superposing of an invisible code, for instance for product authentication, on a visible code, for instance for consumer advertising or supply chain activities, in a specific area, i.e. a limited zone, of the product package or item. However, there is no improvement of the security level by the superposition of markings, i.e. the visible and invisible codes.

There is therefore a need to provide a unique marking on an item and to increase security as well as the number of different and distinguishable markings or patterns for which reliable authentication is possible.

Document U.S. Pat. No. 6,119,943 describes a multilayer barcode arrangement using wavelength separation. Using multiple layers of barcodes or other machine-readable code substantially increases the density of information gathered by the scanner within the same scan pass length or area coverage. A security feature is provided where the barcode is not visible to the human eye. first machine-readable identification code is opaque to a first wavelength range and transparent to a second wavelength range, and further an overlay image over and at least partially covering the first code is transparent to the first wavelength range and opaque to the second wavelength range.

Document US 2003/0042317 A1 describes a lottery ticket barcode. The ticket is provided with a play area covered by a scratch-off material. A two-dimensional barcode containing validation data as well as inventory data is printed on a lottery ticket. A portion of the barcode is covered by a scratch-off material. The scratch-off material should cover a sufficient portion of the barcode in order to prevent validation of the lottery ticket if the barcode is read by a barcode reader prior to removal of the scratch-off material.

Document U.S. Pat. No. 3,711,683 describes a re-price marking method and a record member. The first record member is provided, at least two fields of data are printed on the first record member, each field includes machine-readable binary code data and also human readable data. One of the fields as a price field containing price data and the first record member is attached to merchandise and means are provided for this purpose. In case it is desired to change the price of the merchandise without changing permanent data then a second record member is provided. The second record member is adhesively secured to the first record member to cover at least the binary code price data but not the binary code machine-readable price data in the other field or fields on the first record member.

SUMMARY

The above-mentioned objects and problems are solved by the subject matter of the independent claims. Further preferred embodiments are defined in the dependent claims.

According to one aspect of the present invention, there is provided a method for marking an item comprising the steps of providing a first predetermined marking on the item; providing a second predetermined marking on the item at least partially overlapping with the first marking; and determining information dependent on a relationship between the first marking provided on the item and the second marking provided on the item.

According to another aspect of the present invention, there is provided an apparatus for providing a marking on an item comprising means for providing a first predetermined marking on the item; means for providing a second predetermined marking on the item at least partially overlapping with the first marking; and means for determining information dependent on a relationship between the first marking provided on the item and the second marking provided on the item.

According to yet another aspect of the present invention, there is provided an apparatus for reading a marking on an item comprising means for reading a first marking on the item; means for reading a second marking on the item at least partially overlapping with the first marking; and means for determining an information dependent on a relationship between the first marking and the second marking.

According to further aspects of the present invention, there are provided corresponding computer programs and computer program products.

BRIEF DESCRIPTION OF THE DRAWINGS

Embodiments of the present invention, which are presented for better understanding the inventive concepts and which are not to be seen as limiting the invention, will now be described with reference to the figures in which:

FIGS. 8A to 8E show schematic views of an overlay of a first marking and a second marking as well as the first marking and the second marking in different lighting conditions and the respective code signature according to another embodiment of the present invention;

FIG. 10 shows a schematic representation of an apparatus for providing a marking on an item.

DETAILED DESCRIPTION

Figure 1A:
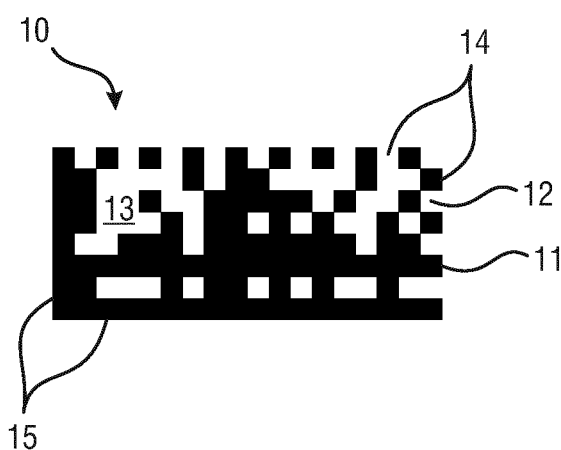
FIGS. 1A to 1C show schematic views of two-dimensional barcodes following conventional standards and examples.

The embodiments of the present invention are aimed at providing a first marking and a second marking on an item, which at least partially overlap with each other. Further information dependent on a relationship between the first marking and the second marking is determined.

An aspect of one embodiment of the present invention is improving the security of the marking by making use of the synergy between the first and the second markings.

The first, second and any further marking on the item may also be called codes or patterns. The markings may be barcodes or more specifically two-dimensional barcodes. The two-dimensional barcodes may include a data matrix or a data matrix symbol and a Quick Response, QR, code (registered trademark) and so on. In particular, the first marking may be visible only in a first predetermined lightning condition such as daylight, white light or the like and the second marking may be visible only in a second predetermined lightning condition different from the first predetermined lightning condition such as ultraviolet light, red light, and the like.

As a result the first and second marking may be read or scanned separately with the dedicated devices or with respective settings of a single device.

In one or more embodiments, one single illumination may enable determining the relationship between the two markings. That is, the first and second marking may be illuminated by a single light source, i.e. with the same lighting condition, such that the information on the relationship between the first marking and the second marking may be determined.

In one or more embodiments, the stored information dependent on the relationship between the first marking and the second marking may be used for authenticating the item.

The disclosed embodiments aim at making use of the synergetic effect between the visible and invisible code to improve the authentication performances of the marking.

A marking may be provided on the item in a predetermined manner. This implies that the appearance, pattern, and any related information content of the single marking is predetermined before the point in time that the marking is actually provided on the item. Depending on the factual accuracy of the employed process for providing the marking, the properties of the predetermined marking are then reproduced by the marking provided on the item. For example, the marking can be in the form of a barcode which carries some payload information. The pattern of the marking is therefore predetermined in the sense that it is known a priori how the marking should actually appear when provided on the marking. The barcode provided on the item can then be scanned or read and decoded so as to reproduce the information that led to the predetermined pattern of the barcode.

The machine-readable marking may be a pattern or a machine-readable pattern. The pattern may be comprised of first and second type elements. In particular, the pattern may be a barcode such as a two-dimensional barcode. The barcode may be a barcode according to the GS1 (trademark) data matrix ECC200 standard (GS1 being an international Association providing standards for barcodes). This standard considers the barcode being formed by two types of elements, namely a first type element and a second type element. The elements can be in form of dots or squares and can be provided or formed on an item (document, product, package, etc.) by any suitable means. Specifically, the first type elements can be printed onto an item surface whereby the non-printed areas then remain to form the second type elements. In general, printing a barcode in the context of the present invention is meant to include any suitable means, such as inter printing, laser printing, etching, embossing, inkjet printing, offset printing, flexographic printing, lithographic printing, screen printing, gravure printing, intaglio printing and spraying etc. Any of these suitable ways to provide or print the barcode on an item can be considered as long as the first and second type elements are formed on the item in a sufficiently stable fashion and remain distinguishable for a sufficient period of time.

The barcode may be a data matrix or a so-called QR code. The data matrix is compiled of an orientation pattern and a payload data pattern. The orientation pattern is compiled of a so-called L-shaped clock line and an L-shaped solid line. The so-called QR code is also compiled of an orientation pattern and a payload data pattern. It is to be noted that the payload data does not need to completely fill the area as defined by the orientation pattern. Specifically, payload data pattern may only make use of a part of that area and other parts may be used for printing clear text messages and/or graphical elements.

FIG. 1A shows a schematic view of a two-dimensional barcode according to the GS1 (trademark) data matrix ECC200 standard (GS1 being an International association providing standards for tow-dimensional barcodes). This standard considers the barcode being formed by two types of elements, namely a first type element 11 and a second type element 12. Elements 11, 12 can be in form of dots or squares and can be formed on an item (document, product, package, etc.) by any suitable means. Specifically, the first type elements 11 can be printed onto an item surface whereby the non-printed areas then remain to form the second type elements 12.

The data matrix barcode 10 is compiled of an orientation pattern 14, 15 and a payload data pattern 13. The former orientation pattern is, in turn, compiled of a so-called L-shaped clock line 14 and an L-shaped solid line 15. Whereas the solid line 15 is compiled of elements of one type only, e.g. of first type elements 11, the clock line 14 is compiled of elements of alternating type. It may be further provided that the corner element of the clock line 14 is of a specific type, e.g. as shown of the first type. The barcode 10 of FIG. 1A is of a so-called asymmetric type, since the numbers of rows and columns differ so as to assume generally a rectangle-like shape.

Figure 1C:
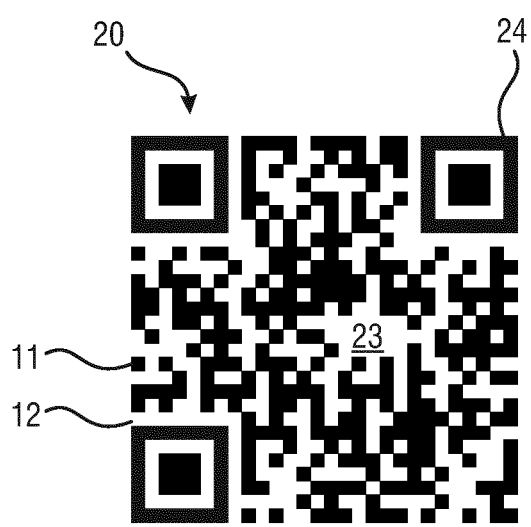
Figure 1B:
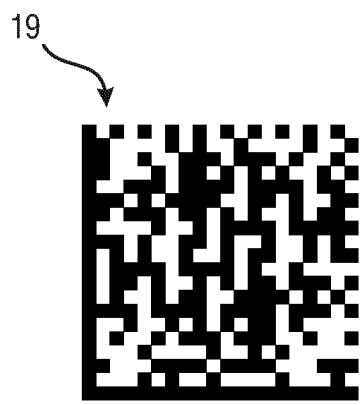

FIG. 1B shows a further example of a data matrix barcode in the form of a symmetric, i.e. square-like, barcode 19. Although both the orientation pattern and the payload data pattern are the same as in the one of FIG. 1A, barcode 19 has the same number of rows as the number of columns. Therefore, barcode 19 assumes the shape of a square.

FIG. 1C shows another type of barcode in the form of a so-called QR-code 20. Likewise, barcode 20 is compiled of first and second type elements 11, 12 which are described in conjunction with FIG. 1A. Also, barcode 20 is compiled of an orientation pattern 24 and a payload data pattern 23. It is to be noted that the payload data 23 does not need to completely fill the area as defined by the orientation pattern 24. Specifically, payload data pattern 23 may only make use of a part of that area and other parts may be used for printing clear text messages and/or graphical elements. In the case of the QR-code 20, the orientation pattern 24 is compiled of three marks which are, in turn, compiled of a black square, e.g. composed of 3×3 first time elements 11, surrounded by a square of second type elements 12, another square composed of first time elements 11 and—at least toward the internal sides of the barcode 20—sections of second type elements 12.

Figure 2:
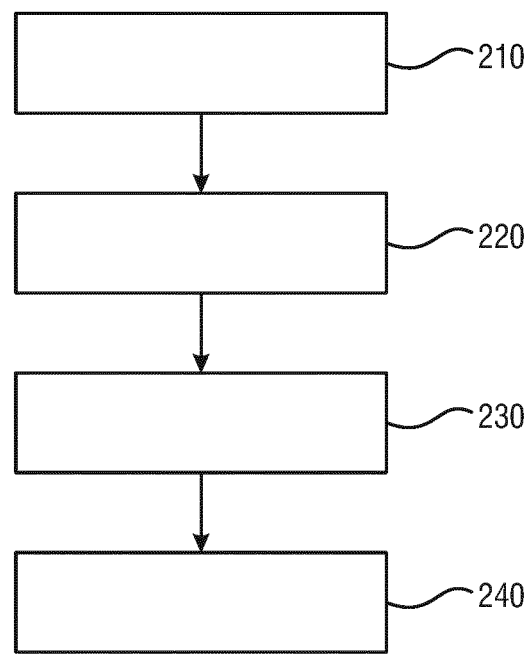
FIG. 2 a schematic flow chart of one method embodiment of the present invention.

FIG. 2 shows a schematic view of one embodiment of the present invention for marking an item comprising the steps of providing 210 a first marking on the item, providing 220 a second marking on the item which at least partially is overlapping with the first marking, and determining 230 an information dependent on a relationship between the first marking and the second marking which may include an explicit measurement.

The first and second markings provided on the item may be any kind of marking or pattern including machine-readable markings, barcodes, two-dimensional barcodes, a data matrix, a QR code and the like. The first and second markings may be provided by any suitable means, such as inter printing, laser printing, etching, embossing, etc. In particular, the first and second markings may be provided by different means, i.e. the first marking may be printed and the second marking may be laser printed or etched.

Further, information dependent on a relationship between the first marking and the second marking is determined.

In one embodiment of the present invention the information dependent on the relationship between the first marking and the second marking is stored in a database (step 240). The information stored in the database may be specific to the single item or to a range of items such as a product line. The information may be retrieved from the database in order to authenticate the item.

In another embodiment of the present invention the information dependent on the relationship between the first marking and the second marking is provided on the item. For instance the information may be encoded and provided as a further marking on the item. Hence, for authentication the further marking provided on the item may be read and decoded in order to obtain the information dependent on the relationship between the first marking and the second marking. Subsequently the information dependent on the relationship between the first marking and the second marking can be obtained from directly reading the first and second marking and determining the information dependent on the relationship between the first marking and the second marking from scratch, i.e. the information is determined or generated at the time of authentication. By comparing the information obtained from the further marking and the newly determined information, the item can be self-authenticated, i.e. for matching information authentication the authentication can be verified and for not matching information authentication the authentication can be denied. An advantage of this embodiment may be that a connection to a database or network for storing the information dependent on the relationship between the first marking and the second marking is not necessary for authentication as the information is determined or generated at the time of authentication.

Figure 3:
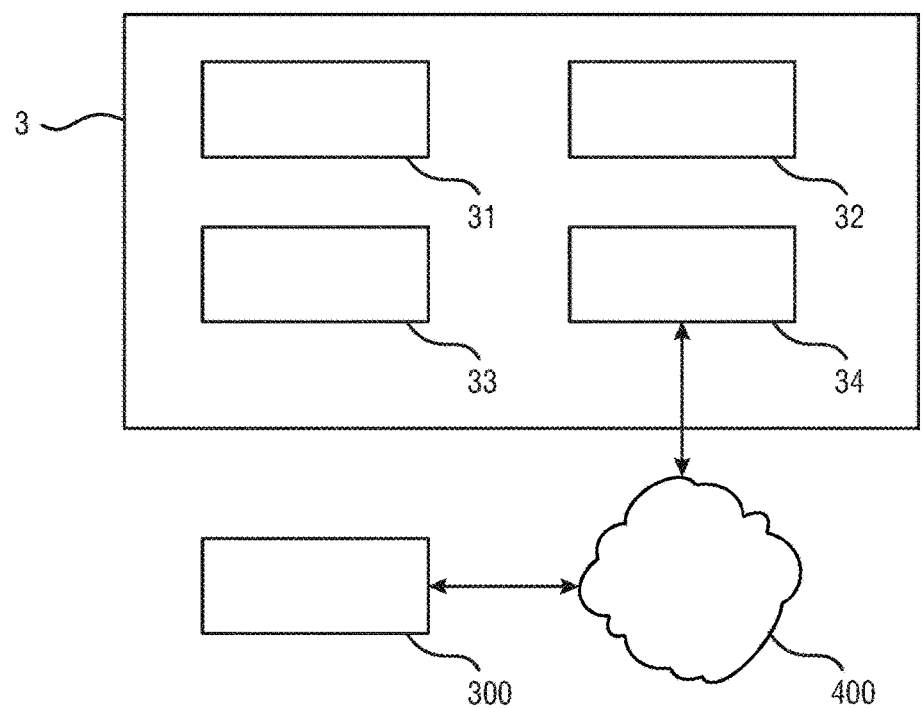
FIG. 3 shows a schematic view of an apparatus for providing a marking on an item according to an apparatus embodiment of the present invention.

FIG. 3 shows an apparatus 3 providing a marking on an item. The apparatus 3 comprises means 31 for providing a first marking on the item, means 32 for providing a second marking on the item, and means 33 for determining information dependent on a relationship between the first marking and the second marking. The apparatus 3 may further comprise means 34 for communicating with a database 300 via a communication network 400.

The means 31 for providing a first marking on the item may comprise means suitable for attaching, i.e. printing, the marking by etching, laser-writing or embossing. Depending on the item and the surface material of the area the marking should be provided on, different means for attaching the marking may be used. For instance if the first marking is provided on a paper or paper like packaging such as cardboard printing means may be used for applying the first marking with appropriate ink.

The means 32 for providing the second marking on the item may comprise means suitable for attaching, i.e. printing, the marking by etching, laser-writing or embossing. In particular, the means 31 for providing the first marking and the means 32 for providing the second marking may use different suitable means for attaching the first and second marking respectively. The means 32 for providing the second marking are configured such that the second marking may be provided at least partially overlapping with the first marking. For instance, in a production line where the item is transported through the production line via a conveyor belt, the means 32 for providing the second marking may be positioned in close proximity to the means 31 for providing the first marking. By employing appropriate timing for providing the first and second marking these may be overlapped. In another embodiment, the item may be at a fixed position and the means 31 and 32 may pass by the item in order to provide the first and second marking at least partially overlapping.

The means 33 for determining information dependent on a relationship between the first marking and the second marking may comprise means for reading or scanning the marking. The marking may result from the first and second marking provided on the item and further markings or labels attached or provided on the item. For instance there may be provided further security markings such as a security stamp or other pattern on the item. Further, there may be provided a label with further information about the item such as a product name, a company name, contents, instructions, and the like.

The means 33 for determining information dependent on the relationship between the first marking and the second marking may be provided with two or more lightning devices capable of providing different lighting conditions necessary to read the first and/or the second marking. For instance the means 33 may include a regular lamp or broadband light source for a white illumination and a red lamp or red light source for red illumination in case the first marking is readable in white lightning condition and the second marking is readable in the red lightning condition. Note in at least one embodiment readable may be understood to be the following where a luminescent marking is used, which upon excitation by an electromagnetic radiation falling within a specific excitation wavelength range is capable of emitting electromagnetic radiation in a specific emission wavelength range. For example, a luminescent marking is excited in UV and the emitted electromagnetic radiation is measured in the visible range of the spectrum.

In order to determine information dependent on the relationship between the first marking and the second marking the means 33 may use the one or more lightning devices at the same time to read the marking or at subsequent times for instance to read at first the first marking in the first lightning condition and subsequently the second marking in the second lightning condition. In other words the first and second lightning condition may not necessarily be exclusive such that a lightning device for a first lightning condition may be used at the same time as a lightning device for a second lightning condition.

The means 34 for communicating with a database 300 may be a communication device for instance for wired and wireless communication for accessing the database 300 via the communication network 400. The means 34 may be an interface to connect to an external device capable of communicating with the communication network 400.

Figure 4:
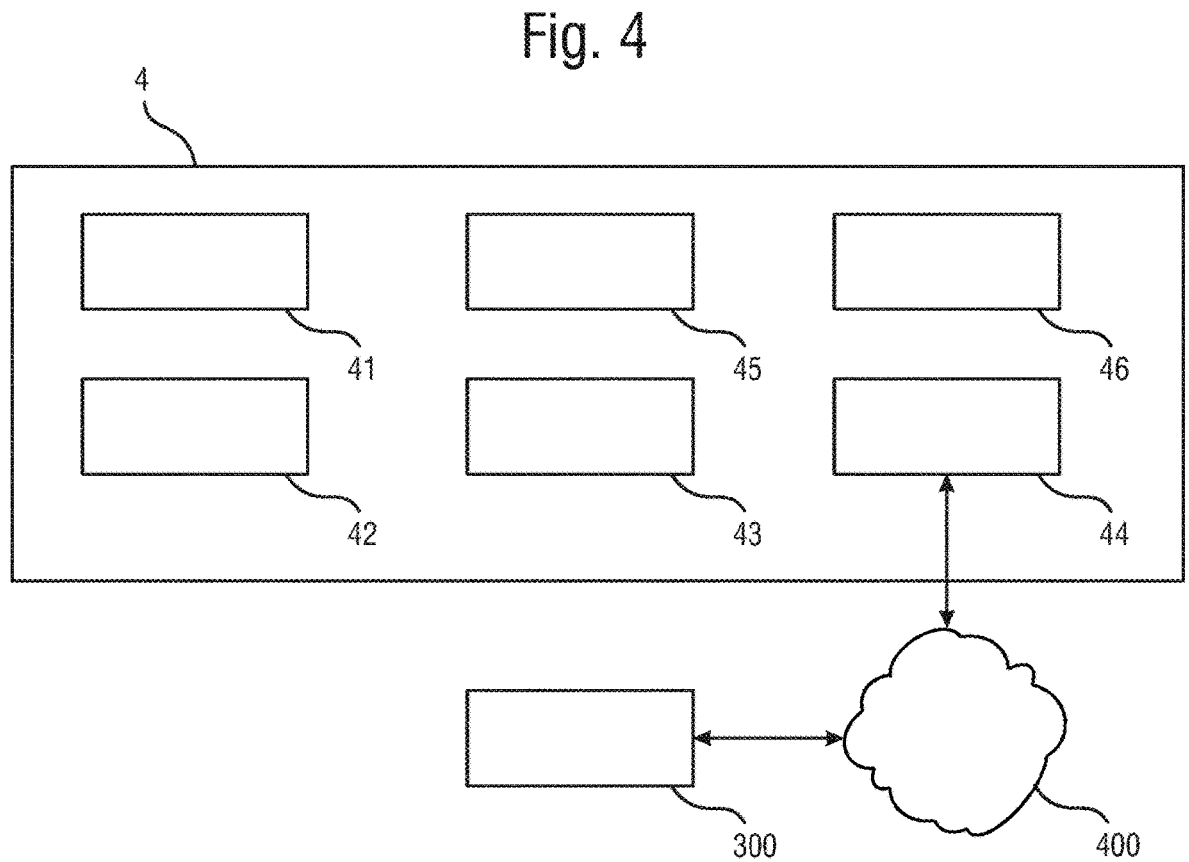
FIG. 4 shows a schematic view of an apparatus for reading a marking on an item according to an apparatus embodiment of the present invention.

FIG. 4 shows an apparatus 4 for reading a marking on an item. The apparatus 4 comprises means 41 for reading a first marking on the item, means 42 for reading a second marking on the item, and a means 43 for determining information dependent on a relationship between the first marking and the second marking. The apparatus 3 may further comprise means 44 for communicating with a database 300 via a communication network 400. The apparatus 4 may further comprise means 45 for retrieving or acquiring information dependent on the relationship between the first marking and the second marking stored in a database for the item or provided on the item. The apparatus 4 may further yet comprise means 46 for comparing the acquired information with the determined information and for authenticating the item based on the comparison between the acquired information and the determined information. In one embodiment of the present invention there are provided separate means for comparing the acquired information and the determined information and means for authenticating the item based on the comparison.

The means 41 for reading a first marking on the item may comprise means for reading and/or scanning the first marking. For instance the means 41 may comprise a regular lamp for illuminating the first marking in case the first marking is visible in a normal lightning condition, i.e. white illumination that leads to a response in one or more specific wavelengths.

The means 42 for reading the second marking on the item may comprise means for reading and/or scanning the second marking. For instance the means 42 may comprise a red lamp for illuminating the second marking in case the second marking is visible in a red lightning condition, i.e. red illumination that leads to a response in one or more specific wavelengths.

The means 43 for determining information dependent on the relationship between the first marking and the second marking may be similar to the means 33 for determining information, as basically the same information is reproduced.

The means 44 for communicating with the database 300 may be similar to the means 34 for communicating only that the information is retrieved, i.e. read or fetched, from the database 300.

In other words, the unique ID stored in the QR code or the Data Matrix may be used to retrieve the reference signature, i.e. information dependent on the relationship between the first marking and the second marking. In fact, during the registration, i.e. enrolment, of the signature, the unique ID of the marking may be associated with the reference signature. During the authentication, first the signature may be estimated and then the decoded unique ID of the marking may be used to retrieve the reference signature and to compare it to the estimated signature. In this way, a one-to-one rather than a one-to-many comparison may be conducted.

The means 45 for retrieving or acquiring information dependent on the relationship may be combined with the means for communicating with the database 300 or in case the information on the relationship is provided on the item, the means 43 may include means for reading or scanning a further marking provided on the item including the information on the relationship.

The means 46 for comparing the acquired information with the determined information and for authenticating the item based on the comparison may include a processing unit, e.g. a processor, a central processing unit or the like, for comparing and authenticating. While comparing the acquired information and the determined information, there may be a range within which the comparison result is considered to authenticate the item. That is, it is not necessary to receive a perfect match, i.e. identical retrieved information and the determined information, for authenticating the item. This way, an error while determining the information may be allowed within the range and further slight degradation of the marking may be considered for authenticating the item.

In one embodiment of the present invention the relationship is generally a relationship between the first and second markings in a state that both markings are already provided on the item. The relationship may be hence unknown before the markings are actually provided on the item. However, the embodiments of the present invention also encompass situations in which the relationship is predetermined in the sense of some kind of target relationship (e.g. a positional relationship). The process employed for providing the markings may be implemented with sufficient accuracy so as to ensure that the predetermined relationship is actually reflected—at least to some kind of allowed tolerance—by the markings provided on the item.

Figure 5C:
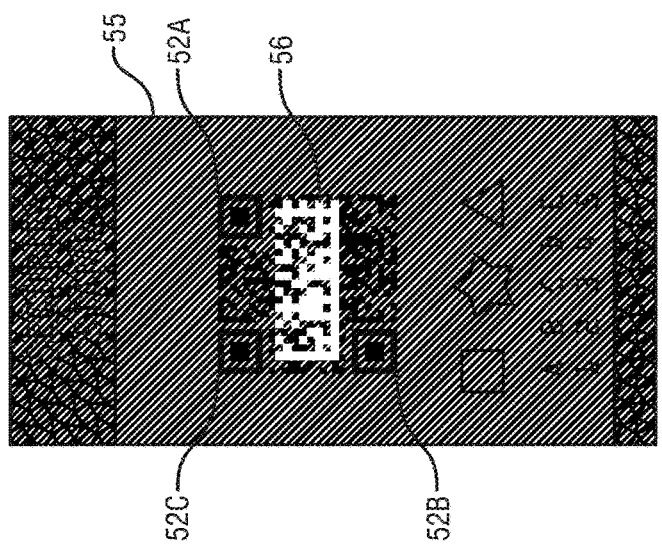
FIGS. 5A to 5C show schematic views of an overlay of a first and second marking as well as the first and second marking in different lighting conditions according to one embodiment of the present invention.
Figure 5B:
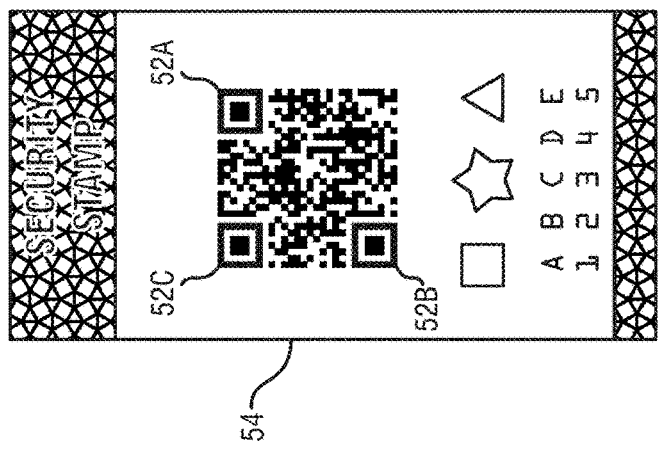
Figure 5A:
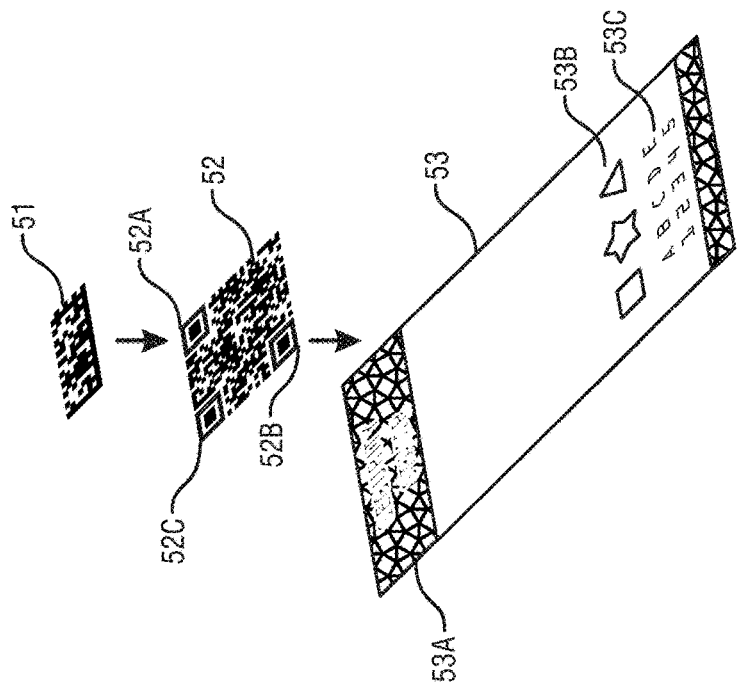

FIG. 5A shows a schematic view of an overlay of a first 51 and second 52 marking on a dedicated area 53 on the item according to one embodiment of the present invention. The first marking 51 may be a data matrix visible only under a first lightning condition such as a red light, UV light, or the like. The second marking 52 may be a QR code visible only under a second lightning condition such as normal light, white light, or the like. The area 53 may be a label on the item or further security marking including a security stamp 53A, symbols 53B as well as letters and numbers 53C for further identification or authentication. In one embodiment the security stamp, i.e. tax stamp, may be an example of a label and may correspond to a security feature known as Guilloche.

In one embodiment the first marking 51 may be printed with ink that is visible when it is illuminated by red light and the second marking 52 may be printed for instance with red ink. As a result as can be seen in FIG. 5B under normal lightning the second marking 52 is visible together with the area 53 as a marking 54. However, if the marking shown in FIG. 5A is illuminated with red light, only the first marking 51 is visible as a marking 56 on the resulting marking 55, as shown in FIG. 5C. This way the marking 54 can be scanned under normal lightning conditions and in addition, the marking 51 may be scanned as marking 56 under red lightning condition. That is, the item may be authenticated by first scanning the marking 54 and subsequently scanning the marking 56. To increase security for authentication the position of the marking 56 on the item or on the area 53 may be determined and stored for later authentication. For instance, the reference marks 52A, 52B, 52C of the QR code 52 may be printed such that they are visible under the second lightning condition, i.e. in red light. This way the position of the marking 56 may be determined relative to the reference marks 52A, 52B, 52C of the second marking 52. That is, the distance between the marking 56 and the reference marks 52A and/or 52B and/or 52C may be determined and for instance stored in a database or provided on the item. Further the distances may be used for instance for quality control as it can be verified that for instance the data matrix is printed properly within the QR code and not somewhere else on the item, i.e. product or substrate. Further any invariant part of the marking, e.g. the orientation pattern, as described in FIGS. 1A, 1B, and 1C may be used for determining the position of the marking 56.

In one aspect of the present invention the relationship between the first marking 51 and the second marking 52 may be a positional relationship. That is, the position of the second marking 52 relative to the first marking 51 may be defined in terms of a translational, rotational or skewing movement or the position of the first marking 51 may be defined with respect to one or more reference marks 52A, 52B, 52C in the second marking 52.

Accordingly the information dependent on the relationship between the first marking 51 and the second marking 52 may then relate to the translation, rotation and/or skew of the first marking 51 with respect to the second marking 52 or may then be defined as a distance, degree of rotation, and the like of the second marking 52 with respect to the first marking 51, e.g. with respect to the one or more reference marks 52A, 52B, 52C.

In other words, the QR-code, i.e. the marking 52, is printed in offset on the packaging, i.e. the area 53. The data matrix, i.e. the marking 51, is printed in continuous inkjet or thermal inkjet at the production line. As both codes are printed at different moment, by nature the position of the data matrix may not be at the same position relative to the three reference squares of the QR-code. The distances of the three reference squares, i.e. reference marks 52A, 52B, 52C, can be used as a signature or fingerprint. The three-tuple composed by the three distances, can be stored in the database and linked to the unique code of the data matrix, thereby speeding up the retrieving of the signature.

Figure 6C:
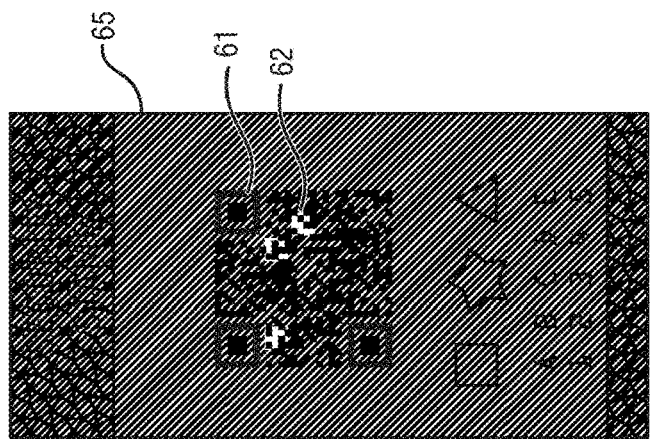
FIGS. 6A to 6C show schematic views of an overlay of a first and second marking as well as the first and second marking in different lighting conditions according to another embodiment of the present invention.
Figure 6B:
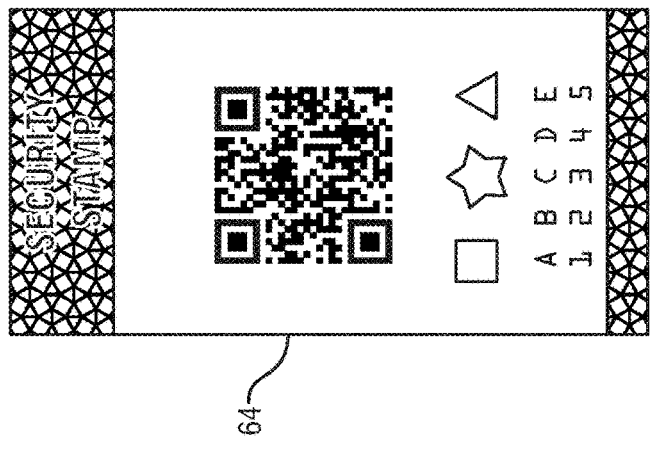
Figure 6A:
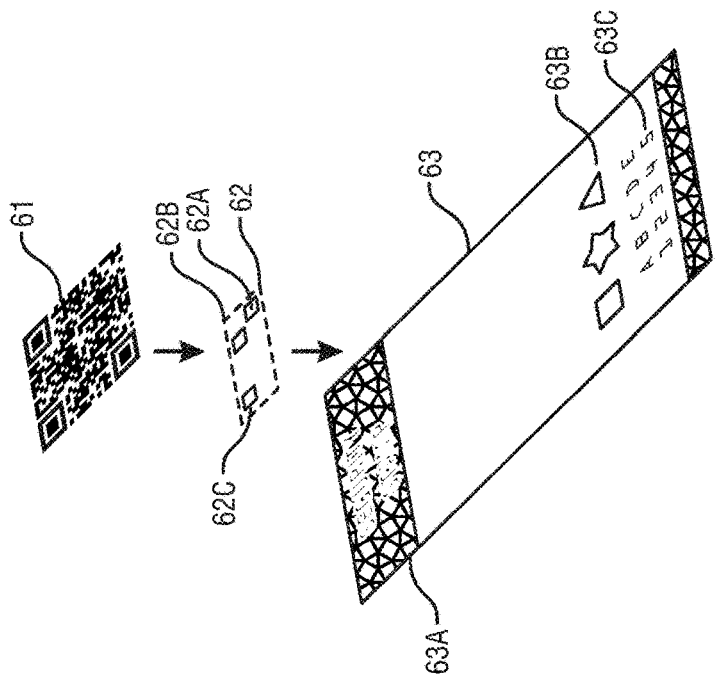

FIG. 6A shows a further embodiment of the present invention wherein a first marking 61 is a QR code and a second marking 62 is a pattern for instance comprised of squares 62A, 62B, 62C. However, any other pattern may be used as the marking 62 as long as it provides sufficient overlap with the marking 61 for determining information dependent on a relationship between the first marking 61 and the second marking 62. As in the embodiment shown in FIG. 5A the first marking 61 and the second marking 62 are provided on an area 63 such as a label or packaging which may include further markings 63A, 63B, 63C for further identification or authentication.

Similar to the embodiment shown in FIG. 5A the first marking 61 may be visible under a first lightning condition such as normal light or white light and the second marking 62 may be visible in a second lightning condition. That is, the marking 64 as shown in FIG. 6B may be visible under the first lightning condition and may be used for processing the item for instance gathering information about the item such as a company name, a product name, content information and the like.

However, when illuminated in a second lightning condition such as red light or UV light the marking 65 is visible wherein in particular the marking 62 may be scanned. The marking 62 in this embodiment may be such that the overlay marking 61 may be visible when illuminated under the second lightning condition. That is, the marking 62 may light up certain areas within the marking 61 including first and second type elements, e.g. dark and light areas.

In other words, a known pattern with invisible ink is printed at a random or predetermined position on the item, i.e. substrate, before or after printing for instance a QR-code with normal black ink. When registering the product, the marking 62, i.e. invisible pattern, is detected and its position under the marking 61, i.e. QR-code, is recorded as part of the item feature. This allows to have both information, i.e. the QR-code as well as the relationship, on the same image when using a reading apparatus, such as an invisible ink reader, or to isolate both by using different excitations.

Figure 7C:
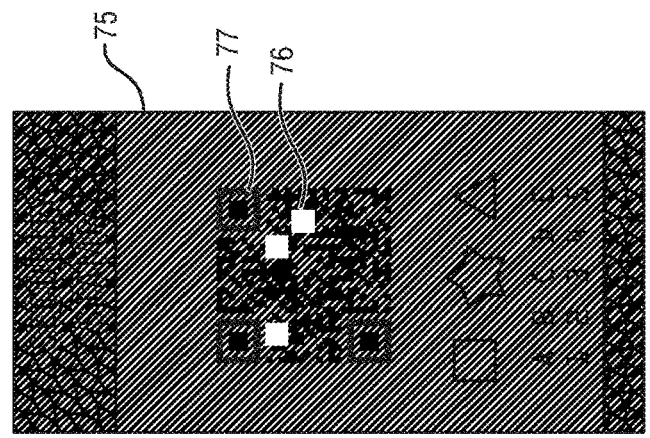
FIGS. 7A to 7C show schematic views of an overlay of a first marking and the second marking as well as the first marking and the second marking in different lighting conditions according to another embodiment of the present invention.
Figure 7B:
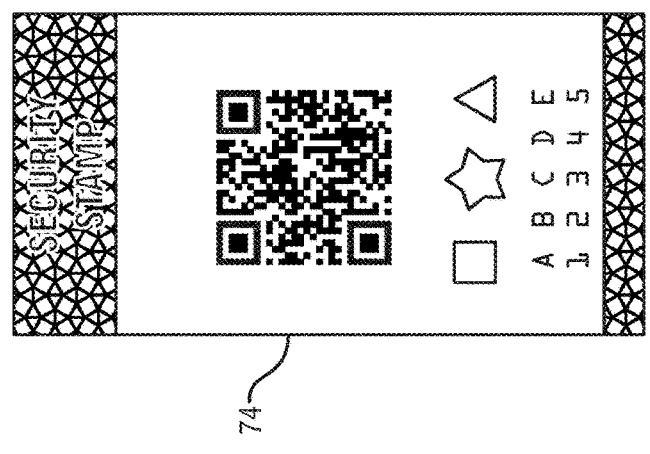
Figure 7A:
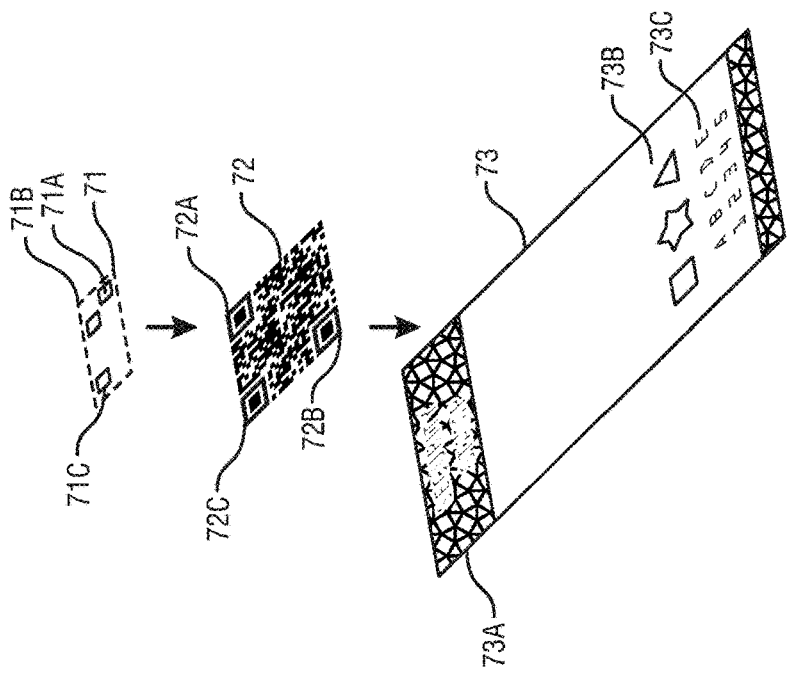

Another embodiment as shown in FIG. 7A wherein a first marking 71 including a specific pattern such as squares 71A, 71B, 71C, and a second marking 72 such as a QR code are provided on an area 73 on the item such as a label or packaging. The area 73 may further comprise a security stamp 73A, symbols 73B and/or numbers and letters 73C.

When illuminated under a first lightning condition such as a normal light or white light marking 74 as shown in FIG. 7B may be visible. The marking 74 may be used for gathering information on the item such as a company name, a product name, contents and the like.

However, when illuminated under a second lightning condition the marking 75 may be visible. The marking 71 may be such that when provided on top of the marking 72 only the marking 71 is visible and no overlay is created as in the embodiment shown in the FIGS. 6A, 6B, and 6C. However, the reference marks 72A, 72B, 72C may for instance be used to determine the position of the pattern included in the marking 71 relative to the marking 72 similar to the determination of the position in the embodiment shown in FIGS. 5A, 5B, 5C. Further any invariant part of the marking, e.g. the orientation pattern, as described in FIGS. 1A, 1B, and 1C may be used for determining the position of the marking 71. The information on the positions may for instance then be stored in the database or provided on the item.

In another aspect of the present invention the relationship between the first marking and the second marking may define a third marking or pattern comprising for instance first and second type elements.

This embodiment of the present invention is shown in FIG. 8A wherein a marking 81 such as a QR code is combined with a marking 82 such as a specific pattern or array illustrated as five vertical bars. The resulting marking 84 is also shown in FIG. 8A. The markings 81 and 82 may be provided on an item as shown in the previous embodiments.

When illuminated under a first lightning condition such as a normal light or white light the marking 85 as shown in FIG. 8B is visible. That is, only the QR code is visible and may be used for gathering information on the item.

However, when illuminated under a second lightning condition such as red light or UV light the marking 86 is visible including a marking 87 such as an overlay of the marking 81 and marking 82. The overlay between the first marking 81 and the second marking 82 may create the marking 87 such as a further pattern which can be used for authentication. That is, the pattern may be determined for instance as a count of the first and second elements, i.e. dark and light areas, included in the marking 81 and visible in the marking 87. For instance the total count of dark elements in the overlay may be determined and stored for further authentication in a database or provided on the item. Alternatively the count of dark elements in each part, i.e. vertical bar, may be determined and stored for further authentication.

However, if only black elements are counted, this may be dominated by the typical filling of QR codes, which for relatively large areas may be around 50%, therefore, one will often count similar amounts of black elements in the invisible ink bars. If a large number of different third markings, i.e. signatures, are desired, the following embodiment may be employed. That is, another example may be decoding the resulting pattern as a data matrix in a sequence of 0s and 1s and subsequently storing the decoded pattern as the sequence of 0s and 1s in a database or providing on the item. In other words, the signature may correspond to a sequence of bits extracted in a specific order, e.g. for each vertical bar of the marking 82 from left to right, read the elements from left to right and top to bottom. The dark element may represent "1" whereas the light element may represent "0".

FIG. 8C shows an enlarged view of the marking 87. The marking 87 provides a unique pattern resulting from the overlay of marking 81 and marking 82. FIG. 8E shows a table including the decoded marking 87 for instance as a signature or fingerprint for the item. This may include the count of a first element, e.g. dark elements, in a first region QR1 and in a second region QR2. This information may be stored in a database or provided on the item. When information is provided on the item it may be further encoded for increased security.

In other words, in a specific embodiment of the present invention a dynamic QR-code in visible dark ink is provided on the item. Then an invisible ink pattern for instance five bars are superposed, that will be highlighted with a specific light source. The dark modules of the QR-code will absorb the luminescence of the invisible ink. By counting the number of dark modules included in the areas of invisible ink, a signature may be generated that will be different for each QR-code. Each signature will be associated to its QR-code and therefore the retrieval and authentication of the signature will be immediate.

In yet another aspect of the present invention the information dependent on the relationship between the first marking and the second marking may be predetermined for instance based on the intended layout, i.e. target layout, of the first and second marking. In other words this embodiment may be based on a predetermined relationship between the two markings. Controlling or mastering of the printing position of each mark to less than 50 μm as well as controlling the size of each printing mark to the same accuracy may be used such that the result of the printing of one marking on top of another is fully predetermined. For instance Drop-on-demand (DOD) printing technology may be used. Accordingly, the steps of providing the first marking and providing the second marking may be separate or may be combined.

In yet another aspect of the present invention the information dependent on the relationship between the first marking and the second marking may be random, that is, the information may depend on the first and the second marking as provided on the item. In other words, while providing the first and second marking on the item there may be tolerances such as printing tolerances. That is, the first and second marking as provided on the item may be different for every single item due to slight changes within tolerances while providing the first and second markings. Accordingly, the determined information dependent on the relationship between the first marking and the second marking is unique for every single item and thus may be used for authenticating the single specific item. For instance Continuous Inkjet (CIJ) printing may be used.

In one aspect of the present invention the third marking is dependent on the first marking and the second marking. That is, the third marking may in one embodiment of the present invention be a superposition of the first marking and the second marking. For instance the second marking may determine a specific area within the first marking such as a pattern of dots or rectangles or a pattern of stripes for instance forming a relay logo type with reference to the item. Overlaying the specific area determined by the second marking selects for instance first and second type elements of the first marking included in the specific area. The selected first and second type elements may for instance form the third marking. In one embodiment, the information on the position of the selected first and second type elements of the third marking may be the determined information dependent on a relationship between the first marking and the second marking and subsequently stored in a database for further authentication of the item. For instance, the surface corresponding to the first elements or second elements, i.e. dark or light squares of a QR code, located within the second marking could be used to generate the third marking, also called a signature. If one just counts first or second elements, the third marking or signature may be dominated by the typical filling of for instance QR codes, which for relatively large areas is around 50%. Therefore, often similar amounts of first or second elements may be counted within the second marking for instance. However, if a large number of different and/or unique third markings should be achieved the third marking may be decoded for instance into a sequence of 0 and 1 representing the first and second elements of the third marking.

The decoding of a barcode usually begins with taking a (digital) image of the barcode attached on a given item. Such an image is then obtained as digital image data defining respective pixel values for the pixels of the image. This digital image data is then subject to image processing by means of a processing unit (e.g. CPU, Computer, Server, Embedded System, ASIC, etc.). Such processing may be divided into various individual steps for eventually decoding the data that is encoded in the barcode.

Since barcodes are usually formed as some kind of binary pattern (in the sense of being composed of elements of two different, distinguishable types), the amount of information that can be kept (encoded) in the barcode depends on the number of columns and rows of the barcode, i.e. the so-called barcode dimensions. In other words, the more columns or the more rows there are, the more distinguishable elements can be arranged in the pattern, and, with this, more bits of information can be encoded.

At the same time, however, the overall size of the barcode is usually subject to restrictions regarding the item's size and shape, the design and surface features of the item, etc. Specifically, it is usually not possible to cover an arbitrary part of an item with a barcode. On the contrary, manufacturers or distributors may substantially limit the area on an item where a barcode can be attached and the will usually want the area covered by a barcode to be as small as possible. In addition to this, also the size of the individual elements is subject to restrictions, since they should remain distinguishable and durable according to the corresponding specifications, and, therefore, may require some kind of minimal size. As a consequence, these limitations may result in the acceptable barcodes to carry only a limited amount of information. That is, the number of different and distinguishable pattern combinations is limited for a given barcode dimension and/or size.

According to the present invention any of the first, second, and third marking may be a machine-readable marking which when illuminated under a first and/or second lighting condition may be read by a suitable apparatus for reading a marking. The apparatus for reading may comprise means for illuminating and means for scanning the marking. The apparatus may further comprise means for processing the read marking compiled of first and second type elements.

Figure 9A:
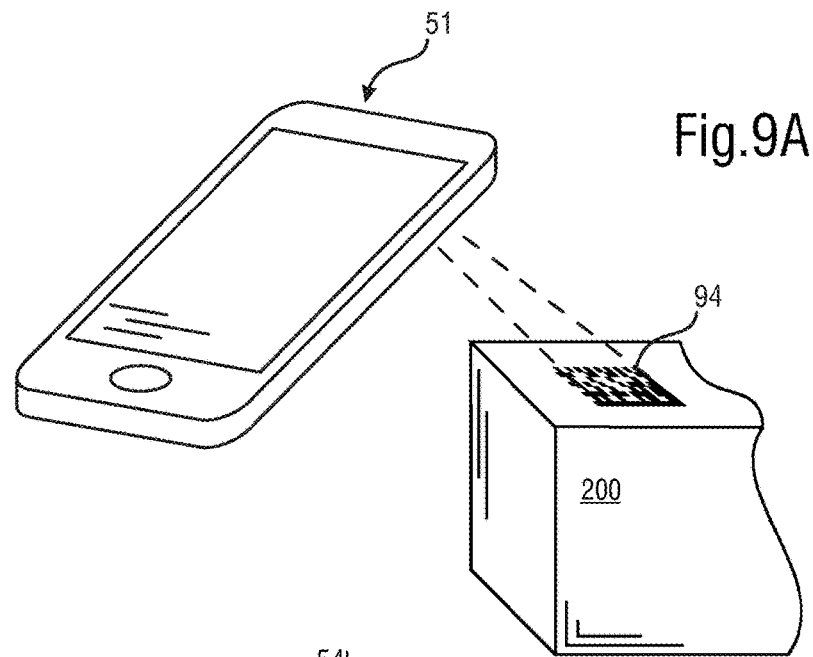
FIGS. 9A to 9C show schematic views of devices for providing and optionally reading the first and/or second markings according to further apparatus embodiments of the present invention.

FIG. 9A shows one embodiment of an apparatus 51 for reading the marking 94 provided on the item 200. The marking 94 may be provided on the item according to any of the embodiments of the present invention. The apparatus 51 shown in FIG. 9A may be a handheld device such as a mobile phone, tablet, or similar device. The handheld device may be provided with means as shown in FIG. 4.

The apparatus 51 may further comprise a processing unit and a memory unit. The memory unit may store code that, when executed on the processing unit, implements one or more method embodiments of the present invention. Optionally, the apparatus 51 may further comprise an acquisition unit for acquiring a digital image data of a barcode attached to an item that is subject to decoding. The acquisition unit can be in form of a CCD (charged coupled device) sensor/camera. Additional elements, such as optical filters, lenses, light sources, and the like, can be included in the acquisition unit. Furthermore, apparatus 51 may comprise a communication unit for communicating a decoding and/or authentication result, acquired data or command data to or from other entities, such as servers, controllers and the like. The communication may be effected over a network, such as a local area network (LAN), wireless network (WLAN), the internet, a short-range wireless link and the like. Further, also bus systems, such as CAN, can be employed for data exchange.

Figure 9B:
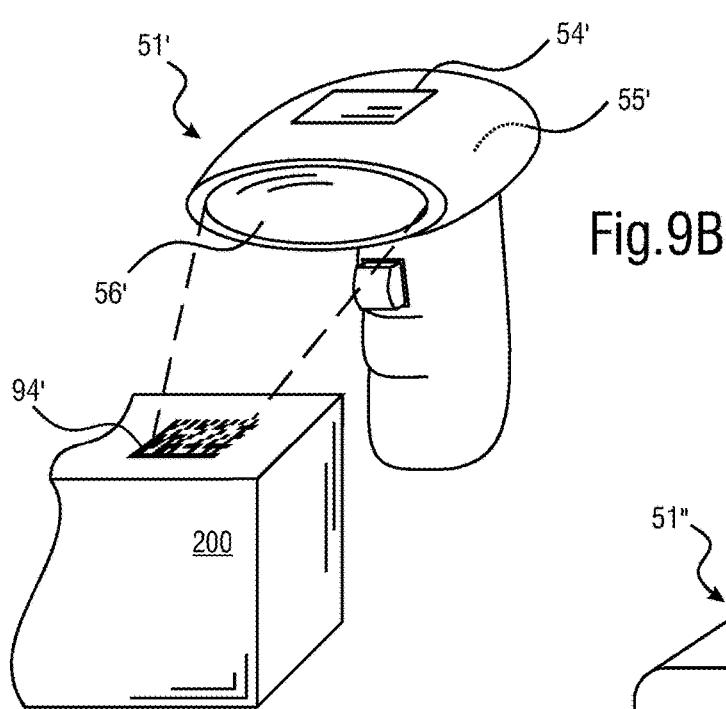

FIG. 9B shows a schematic view of a handheld embodiment of an apparatus 52' for reading and/or decoding a barcode. The apparatus 52' may comprise a body 55' and further comprise means 54' for communicating the authentication result to a user as well as a window 56' through which also a digital image of the barcode on an item that is subject to inspection can be acquired. As shown, a barcode is applied to an item and placed in the field of view of apparatus 52'. The apparatus 52' further comprises integrated processing equipment, usually including a processing unit, a memory unit, and possibly also a communication unit. Besides one or more (optional) operation buttons, apparatus 52' may also comprise notifying means (display, light indicators, and the like) for communicating a decoding and/or authentication result to a user. In case of a display being a touch-sensitive display, it can be dispensed with any further operation buttons/elements, since device operation can be fully facilitated by means of a touch screen. The apparatus 52' may also comprise an optional light source for illuminating an item during inspection. Yet further, additional means may be provided for acoustically notifying an authentication result to a user.

Figure 9C:
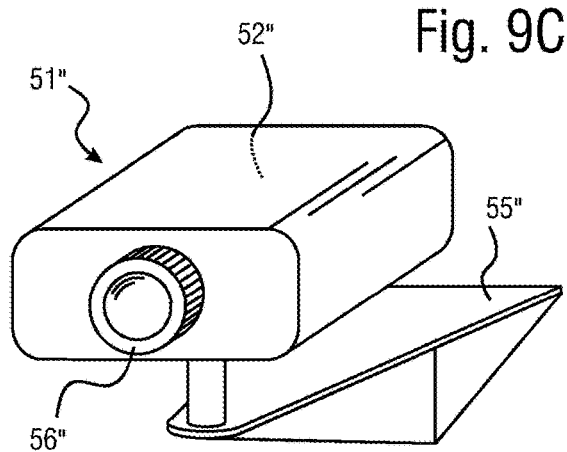

FIG. 9C shows a schematic view of a fixed-type embodiment of an apparatus 52" for reading and/or decoding. Like, for example, a module operable to be mounted via a mount 55" on a production/distribution line for reading barcodes disposed on items transported on said line. The apparatus 52" comprises a body 52" and a window 56" through which an image of a barcode, usually as attached to an item, can be acquired. The apparatus 52" further comprises integrated processing equipment, usually including a processing unit, a memory unit, and possibly also a communication unit. Besides one or more (optional) operation buttons, apparatus 52" may also comprise an optional light source for illuminating an item during the acquisition of the image. An additional fixation element may be provided for mounting the apparatus 52" at, for example, a production line in which a plurality of items pass by the device for inspection and/or authentication. The device may, of course, take other forms and may be wire-bound or wireless.

In the embodiments described in conjunction with any one of FIGS. 9A, 9B, and 9C, the processing resources (or processing and memory units) are configured to implement one or more method embodiments of the present invention, and, more specifically, to implement a method according to the present invention. The compiled information or a (authentication) result from the compiled information is communicated and/or displayed.

It may be also conceivable to attach the barcode to the product as such, wherein—as long as the implementation permits—the marking can be directly attached to for example a housing of an electronic device. Such examples also include beverage packages such as cans and bottles. In this sense, the product itself can be a part of the package as, for example, a bottle cap. Such metallic parts may be particularly suitable for attaching (printing) the barcode by etching, laser-writing or embossing means. Usually, item 31 (package, product, etc.) has some design features 311 on its surface. Common examples are multi-colour and graphically designed logos, brand names, product descriptions, hazard warnings, and the like that are printed or applied in any other suitable fashion to a package/product surface. Thus, marking can generally overlap with such features and there should be as few as possible restrictions regarding the design, appearance, and optical characteristics of features and also regarding the positioning of the marking relative to features. Furthermore, some kind of cover may be arranged on top of the package surface and—with this—also the marking. Examples for the cover include protective coatings, such as transparent plastic films, transparent lacquer films, and the like. Moreover, the package may also be subject to contamination and dirt, so that the cover may be in the form of an irregular and uncontrollable accumulation of dust/dirt particles or dried liquids.

FIG. 10 shows a schematic representation of an apparatus 1000 for providing a marking 1010 an item 1020 were the item is for instance past along the apparatus 1000 on transportation means 1030 such as a conveyor belt. In another embodiment the apparatus 1000 may be passed by the item 1020. The apparatus 1000 may for instance be provided in a production line.

The apparatus 1000 may comprise means 1100 for providing a first marking on the item 1020, means 1200 for providing a second marking on the item at least partially overlapping with the first marking, and means 1300 for determining information dependent on a relationship between the first marking and the second marking. The apparatus 1000 may further optionally comprise means 1400 for providing the determined information dependent on the relationship between the first marking and the second marking on the item. The means 1100, 1200, 1300, and 1400 may be provided separately or may be combined.

The means 1100 for providing a first marking on the item may include any suitable means, such as inter printing, laser printing, etching, embossing, etc. Any of these suitable ways to provide or print the barcode on an item can be considered as long as the first and second type elements are formed on the item in a sufficiently stable fashion and remain distinguishable for a sufficient period of time. However, the first marking may already be provided on the item.

The means 1200 for providing a second marking on the item may also include any suitable means, such as inter printing, laser printing, etching, embossing, etc.

The means 1300 for determining information may further include scanning means for scanning the marking 1010 on the item 1020 in form of a CCD (charged coupled device) sensor/camera. The means 1300 may further comprise may include a processing unit, e.g. a processor, a central processing unit for determining the information from the scanned marking 1010. The means 1300 may further yet comprise storage means for storing the determined information. The means 1300 may further comprise means for communicating with a database via a communication network.

The means 1400 may comprise any suitable means, such as inter printing, laser printing, etching, embossing, etc. for providing the determined information on the item. The means 1400 may further comprise processing means such as a processing unit, a processor, a central processing unit for encoding the determined information before the determined information is provided on the item.

An embodiment of the present invention may include a marking method for product authentication comprising the steps of printing a visible mark and an invisible mark on a substrate, a part of the visible mark overlaps with a part of the invisible mark; and determining the position of the invisible mark with respect to the visible mark.

Another embodiment of the present invention may include a marking method for product authentication comprising the steps of printing a visible mark and an invisible mark on a substrate, a part of the visible mark overlaps with a part of the invisible mark; and generating a signature based on the overlap between the invisible mark and the visible mark.

Although detailed embodiments have been described, these only serve to provide a better understanding of the invention defined by the independent claims, and are not to be seen as limiting. In particular it is possible to freely combine embodiments or certain features of embodiments of the present invention.

The invention claimed is:

1. A method for marking an item for the item authentication, the method comprising the steps of:
providing a first predetermined machine-readable marking on the item;
providing a second predetermined machine-readable marking on the item at least partially overlapping with the first marking,
wherein the first marking comprises first and second type elements which are visible in a first predetermined lightning condition being a normal light or white light, and the second marking is visible only in a second predetermined lightning condition different from the first lightning condition and being red light or UV light,
wherein the first marking is a QR-code and the second marking is a data matrix;
illuminating the markings in the second predetermined lightning condition to derive information used for the item authentication from the markings, where the information depends on a positional relationship between the first marking provided on the item and the second marking provided on the item, the information being:
a) a representation of a third machine-readable marking formed by overlapping parts of the first marking and the second marking, wherein the first marking overlays the second marking and the third machine-readable marking is determined as the first and second type elements of the first marking being visible in a part of the second marking where the second marking lights up the first and second elements of the overlapping part of the first marking by emitting electromagnetic radiation under the second predetermined lightning condition, or
b) defined as a distance or degree of rotation of the second marking with respect to one or more reference marks, wherein the first marking further comprises the one or more reference marks and the one or more reference marks are visible under the second predetermined lightning condition;
storing the derived information for the item in a database.

2. The method of claim 1, wherein the information dependent on the relationship between the first marking and the second marking is provided on the item.

3. The method of claim 1, wherein the third marking is a barcode compiled of first and second type elements.

4. The method of claim 3, wherein the barcode is a two-dimensional barcode and is preferably anyone of a symmetric data matrix, an asymmetric data matrix, and a QR-code.

5. The method of claim 1, wherein the information dependent on the first marking and the second marking is predetermined based on the first marking and the second marking.

6. The method of claim 1, wherein the information dependent on the first marking and the second marking is unique for the item.

7. An apparatus for providing a marking on an item for the item authentication, the apparatus comprising means for carrying out the steps of claim 1.

8. The apparatus of claim 7, further comprising processing resources configured to implement the steps of:
provide the first predetermined machine-readable marking on the item;
providing the second predetermined machine-readable marking on the item at least partially overlapping with the first marking; and
illuminating the markings in the second predetermined lightning condition to derive the information used for the item authentication from the markings; and
storing the derived information for the item in the database.

9. The apparatus of claim 8, wherein the processing resources comprise a processing unit and a memory unit, the memory unit being configured to store code executable by the processing unit.

10. A computer program comprising code executable by a processing unit, the code when executed implementing a method of claim 1.

11. A computer program product comprising a tangible medium storing the code of the computer program of claim 10.

12. The method of claim 1, wherein the second marking is selected from a symmetric data matrix and an asymmetric data matrix.

* * * * *